(No Model.)
J. T. FANNING.
END BEARING FOR CAR AXLES.
No. 462,037. Patented Oct. 27, 1891.
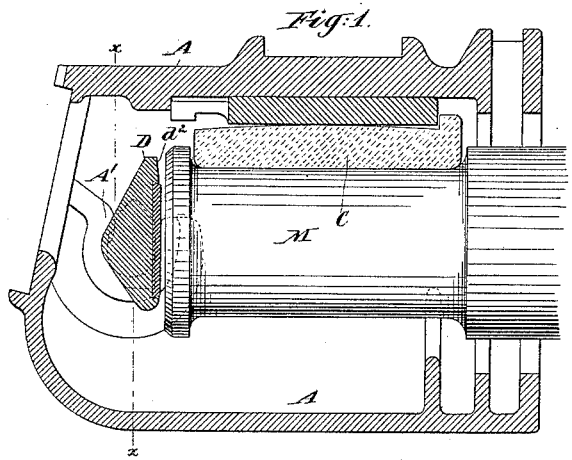
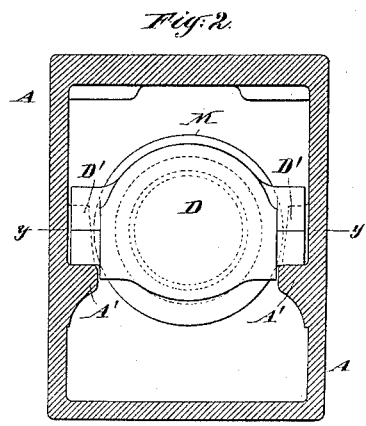
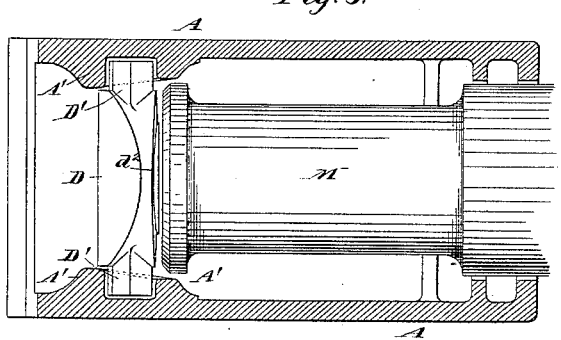
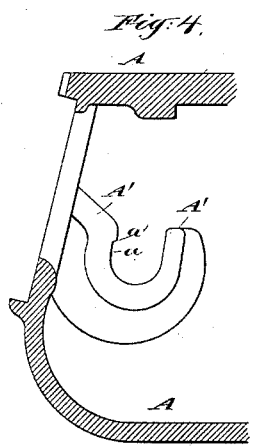
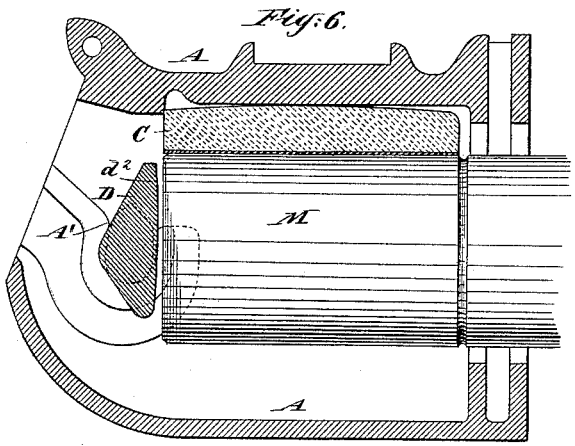
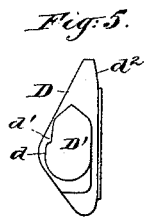
Witnesses:
Charles R. Searle.
Maud Koch.
Inventor:
John T. Fanning
by his attorney
Thomas Drew Stetson

UNITED STATES PATENT OFFICE.

JOHN T. FANNING, OF MINNEAPOLIS, MINNESOTA.

END BEARING FOR CAR-AXLES.

SPECIFICATION forming part of Letters Patent No. 462,037, dated October 27, 1891.

Application filed January 14, 1891. Serial No. 377,694. (No model.)

*To all whom it may concern:*

Be it known that I, JOHN T. FANNING, consulting engineer, a citizen of the United States, residing in the city of Minneapolis, Hennepin county, State of Minnesota, have invented a certain new and useful Improvement in End Bearings for Railway-Car Axles, of which the following is a specification.

End bearings serve to relieve the shoulders of the axles from wear and to allow the use of axles in which the shoulders or contractions at the inner ends of the bearings and the flanges at the outer ends of the bearings are greatly reduced or admitted altogether. Their importance has been long recognized and several useful forms have been developed.

I have devised a construction of the end bearing and of the interior of the inclosing box, generally known as the "axle-box," by which with little expense I produce a combination which is strong and simple and allows the end bearing to be conveniently applied and removed. It also allows great facility for examination and for removing and renewing the cotton waste or other material which is required to fill the lower portion of the axle-box and aid in retaining the oil and applying it to the bearing.

The liability of the two ends of the car-axle to be raised and lowered unequally in traversing over roughnesses in the track and the liability of the truck to tilt to one side and the other while the axle remains level, or may chance to be momentarily inclined in the opposite direction make it important to provide for a tilting of the axle relatively to the box, and to allow the end-bearing disk to correspondingly tilt in the box, so as to always conform to the position of the axle and give a fair bearing. I slightly swell the inner face of the end-bearing disk or the outer end of the axle, or both, which somewhat reduces the necessity for such tilting; but I provide, also, efficiently for allowing a tilting action.

Figure 1 is a vertical longitudinal section through an axle-box. Fig. 2 is a vertical section on the line $x\,x$ in Fig. 1. Fig. 3 is a longitudinal section on the line $y\,y$ in Fig. 2. Fig. 4 is a longitudinal vertical section of a portion with the internal parts removed. Fig. 5 is an edge view of the removable disk detached. Fig. 6 shows a modification. It is a longitudinal vertical section.

Similar letters of reference indicate corresponding parts in all the figures where they appear.

A is the axle-box, of cast-iron, certain portions being designated, when necessary, by additional marks, as A'. There may be the usual lid hung to the axle-box A by a knuckle-joint. There may be the ordinary provisions for retaining a suitable brass C.

D is an end-bearing disk, formed of cast-steel, having a slightly swelled smooth inner face $d^2$. The central portion of the face $d^2$ may also be of Babbitt metal, leather, or other suitable material. The disk is approximately circular and has two stout trunnions D' D' cast integral therewith and having flattened outer faces through which the thrust is transmitted to the adjacent upright face of the ridge A'.

The interior of the axle-box is formed with a stout ridge A' on each side. A nearly-upright portion on the outer side of each is adapted to receive the strong end-thrust communicated to it under certain conditions from the axle M through the disk D. A semicircular seat receives a corresponding trunnion and supports it at the proper height. Another upright portion of the ridge extends up on the inside of the trunnion and is mainly important in keeping the end-bearing disk in place when the axle-box is removed from the axle, carrying the disk D with it for repair or exchange. The outer portion on each ridge A' is curved at its upper end, as shown. The vertical depth of the disk D and the thickness of the trunnions D' and the height of the curved portion of the ridges A' are so proportioned that when the lid is raised the disk may be easily introduced and removed, the trunnions D' being moved outward and inward over the curved top of the ridge A', and when lowered into place resting on their bearings in the bottom of the ridge. The inner face of the ridge is slightly beveled under, as indicated at $a\,a$, and also formed with a slight offset, as indicated at $a'$. The rear face of each trunnion D' is correspondingly inclined, as indicated at $d\,d$, and formed with a corresponding offset $d'$, which is the counterpart of the offset $a'$. There is always, even when the parts are new, sufficient looseness in fitting the parts together to allow the end disk D to be lowered into place and removed when the axle is moved endwise inward as far as the slack or looseness in the box at the other end will allow. Such looseness is increased by wear, so that in taking an old disk out there is always ample room for the movement.

Modifications may be made without departing from the principle or sacrificing the advantages of the invention. The advantage due to the inclines $a$ $d$ and the offsets $a'$ $d'$ lies in the reliable holding means which they afford to prevent the disk D from being rotated. When the end-thrust is strong and the rotatory motion is rapid there is considerable friction tending to rotate the disk; but under those conditions the inclined position of the bearings $a$ $d$ forbids a rotation. The offsets $a'$ $d'$ serve a corresponding function by arresting the rotation of the disk after it has turned a little way. I can dispense with the offsets $a'$ $d'$ and depend on the inclines $a$ $d$ alone, or I can dispense with the inclines and depend on the offsets alone to prevent the rotation.

I claim as my invention—

1. In a car-axle box, a thrust-bearing disk having axial trunnions formed integral therewith and self-adjusting in seats formed in the interior of the box, in combination with such seats and arranged to allow for vertical changes in the axial direction of the car-axle relatively to the axle-box, all adapted to serve as herein specified.

2. In an axle-box, the thrust-bearing disk D, with trunnions formed integral therewith, in combination with the ridges A' on the inner faces of the inclosing box A, the parts being locked against revolving with the axle when subject to the end-thrust by the engagement of the trunnions and ridge, substantially as herein specified.

3. The combination of the axle M, box A, with its internal curved ridges A', brass C, thrust-bearing d:sk D, and trunnions D', formed integral with the said disk, all arranged for joint operation, as herein specified.

In testimony that I claim the invention above set forth I affix my signature in presence of two witnesses.

JOHN T. FANNING.

Witnesses:
CHARLES R. SEARLE,
H. A. JOHNSTONE.